Aug. 3, 1965   E. R. RISH   3,198,587
FRONT IDLER GUIDE FOR TRACTOR TREADS
Filed Dec. 31, 1963   2 Sheets-Sheet 1
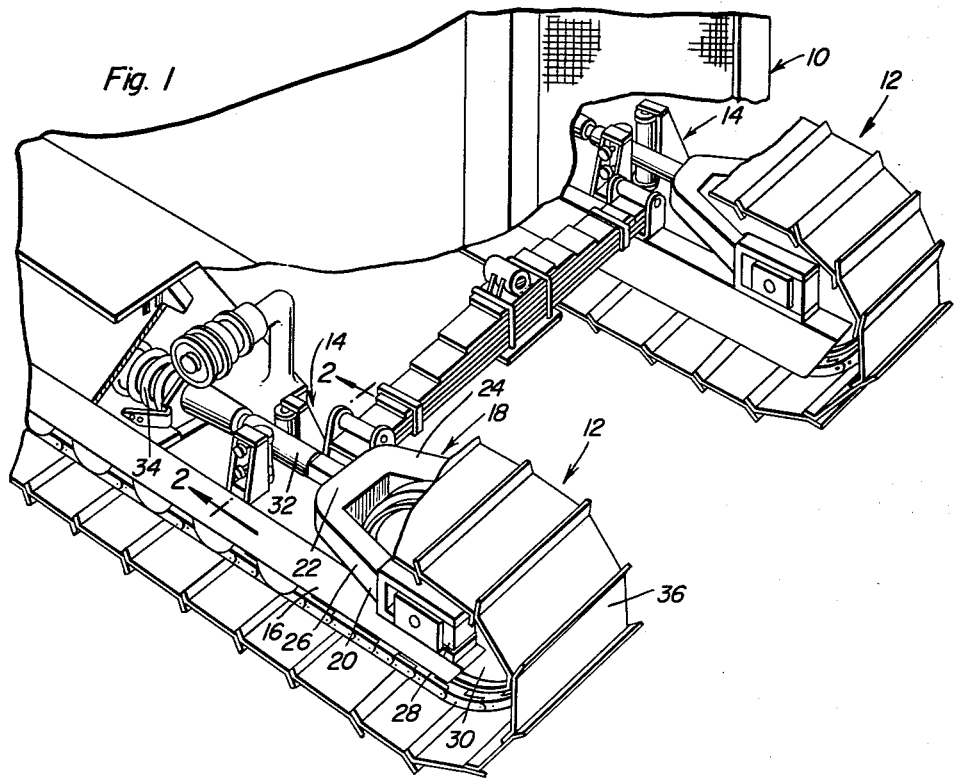
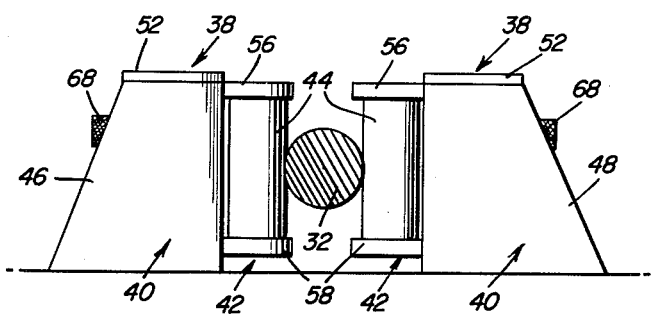
Ervin R. Rish
INVENTOR.

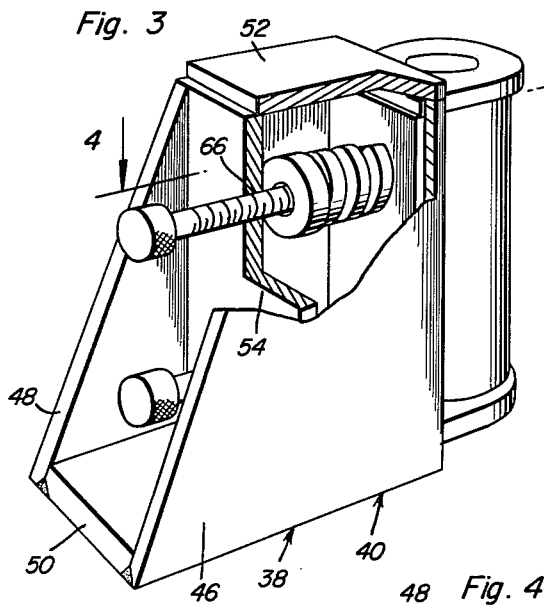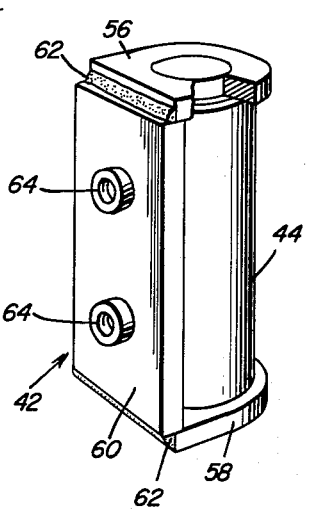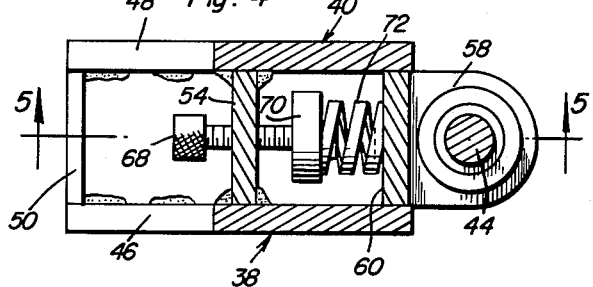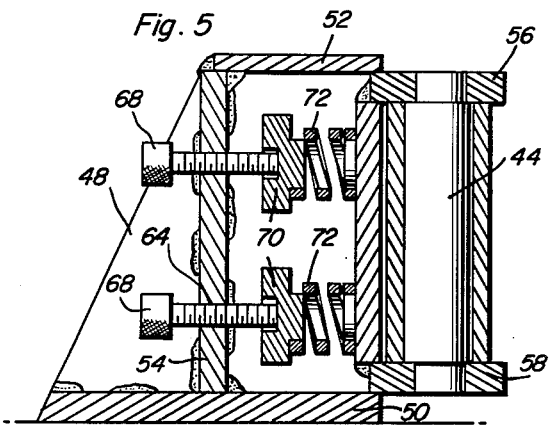
Ervin R. Rish
INVENTOR.

United States Patent Office 3,198,587
Patented Aug. 3, 1965

3,198,587
FRONT IDLER GUIDE FOR TRACTOR TREADS
Ervin R. Rish, 1815 8th St., Cayce, S.C.
Filed Dec. 31, 1963, Ser. No. 334,792
3 Claims. (Cl. 305—31)

This invention relates to a novel and useful idler guide for a tractor tread assembly of the type including an elongated roller frame having a first fixed transversely extending journal adapted to journal a drive sprocket on one end, a second transversely extending journal adapted to journal an idler wheel on the other end and mounted on the other end of the roller frame for movement longitudinally thereof, and an elongated thrust bar member connected at one end to the second journal means and at the other end to force means disposed between the first and second journals and secured to the roller frame for applying a yieldable force on the bar member to urge the latter toward the end of the frame on which the scond journal is mounted thereby yieldingly urging the second journal longitudinally of the roller frame away from the first fixed journal.

One of the major problems, both in terms of service and cost, has always been excessive wear of the roller flanges of a tractor tread assembly, the rail sides and the idler and sprocket wheels. A majority of this wear is the result of the idler wheel being misaligned with the drive sprocket.

The front idler guide of the instant invention has been specifically designed to hold the idler wheel rigidly parallel to the corresponding drive sprocket and in exact alignment therewith without affecting the necessary shifting of the idler wheel journal longitudinally of the roller frame which enables adjustment in the tension of the endless track assembly and provides a recoil action to prevent breakage of the track rails and other components of the tractor tread assembly.

The idler wheel journal guide of the instant invention is constructed so as to be adapted to be attached permanently to the guide roller frame and includes a pair of upstanding rollers which are journaled for rotation about upstanding axes and disposed on opposite sides of the bar member which yieldably urges the idler wheel journal longitudinally of the roller frame. The guide rollers are mounted in a manner so as to be yieldingly urged toward each other whereby they embracingly engage opposite sides of the elongated bar member and maintain the idler wheel journal in position against angular displacement relative to the axis of rotation defined thereby.

The idler guide of the instant invention is further constructed in a manner whereby it may be readily operatively mounted on various makes and models of practically all tractor tread assemblies built in this country.

The main object of this invention is to provide an idler guide for a tractor tread assembly including means connected between the roller frame of the tractor tread assembly and the shiftable idler wheel journal operable to maintain the idler wheel journal properly positioned with the idler wheel journaled thereby maintained in substantially perfect alignment with the corresponding drive sprocket.

A further object of this invention, in accordance with the immediately preceding object, is to provide an idler guide that will be readily adaptable to various makes and models of practically all tractor-tread assemblies.

A still further object of this invention is to provide an idler wheel journal guide which will be capable of maintaining the idler wheel rotatably supported by the idler wheel journal in substantially perfect alignment with the associated drive sprocket without interfering with the shifting of the idler wheel journal longitudinally of the associated roller frame in any way.

A final object of this invention to be specifically enumerated herein is to provide an idler guide in accordance with the preceding objects which will conform to conventional forms of manufacture, be of simple construction and easy to install so as to provide a device that will be economically feasible, long-lasting and relatively troublefree in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the front end of a conventional form of crawler tractor shown with portions of the tractor and tractor tread assemblies being broken away to more clearly illustrate the structural details thereof and with the idler guide of the instant invention operatively mounted on each of the track roller frames;

FIGURE 2 is a fragmentary enlarged transverse vertical sectional view taken substantially upon the plane indicated by the section line 2—2 of FIGURE 1;

FIGURE 3 is an enlarged perspective view of one of the idler guide assemblies which in a pair comprise the idler guide of the instant invention and with portions of the idler guide assembly being broken away and shown in section;

FIGURE 4 is a horizontal sectional view taken substantially upon the plane indicated by the section line 4—4 of FIGURE 3;

FIGURE 5 is a vertical sectional view taken substantially upon the plane indicated by the section line 5—5 of FIGURE 4; and FIGURE 6 is a perspective view of one of the bearing member carriers of the idler guide of the instant invention shown rotatably supporting the associated guide roller.

Referring now more specifically to the drawings the numeral 10 generally designates a conventional form of crawler tread tractor including a pair of tractor tread assemblies each generally referred to by the reference numeral 12.

Inasmuch as each tractor tread assembly, as far as the instant invention is concerned, is identical to the other and the associated idler guides of the instant invention generally designated by the reference numerals 14 are therefore also identical, only one of the tractor assemblies 12 and its associated idler guide 14 will be specifically described herein.

Each tractor tread assembly includes an elongated longitudinally extending roller frame 16 which rotatably journals a drive sprocket (not shown) on one end by means of a fixed journal assembly (not shown). In addition, the roller frame 16 also includes a second idler wheel journal assembly generally referred to by the reference numeral 18. From FIGURE 1 of the drawings it may be seen that the idler wheel journal assembly 18 comprises a bifurcated member 20 including a bight portion 22 which interconnects a pair of furcations 24 and 26. The free ends of the furcations 24 and 26 include aligned journal components 28 that rotatably journal the corresponding idler wheel 30. The free ends of the furcations 24 and 26 are mounted on opposite sides of the adjacent end of the roller frame 16 for movement longitudinally of the frame 16. An elongated bar member 32 which is adjustable in length is secured at its forward end to the bight portion 22 and at its rear end to the front end of a heavy coil spring or recoil cylinder 34 which extends longitudinally of the roller frame 16 and has its rear end fixed relative to the roller frame 16. In this manner, the recoil cylinder or spring 34 yieldably urges the journal components 28 away from the associated idler sprocket (not shown) in order to apply the proper amount of tension to the endless tread assembly 36 which is entrained about the idler wheel 30 and the associated drive sprocket (not shown).

The idler guide 14 of the instant invention comprises a pair of guide assemblies generally referred to by the reference numeral 38. A pair of the guide assemblies 38 is provided for each tread assembly 12 and each guide assembly includes a base portion generally referred to by the reference numeral 40, a bearing member carrier generally referred to by the reference numeral 42, and a bearing roller 44 which is journaled from the associated bearing member carrier. The base portion comprises a pair of opposite side walls 46 and 48 which are interconnected at their lower ends by means of a bottom wall 50 and at their upper ends by means of a top wall 52. An upstanding end wall 54 is secured between the side walls 46 and 48 and to the bottom and top walls 50 and 52 in any convenient manner such as by welding, the bottom and top walls 50 and 52 also being welded to the side walls 46 and 48.

One end of the housing defined by the walls 46, 48, 50, 52 and 54 is open and snugly and slidably receives the corresponding bearing member carrier 42 which is generally U-shaped and includes a pair of apertured upper and lower walls 56 and 58 interconnected at one end by means of an upstanding end wall 60 which is secured between the walls 56 and 58 in any convenient manner such as by welding 62. The bearing roller 44 is journaled between the walls 56 and 58 and the end wall 60 has a pair of cylindrical seat-forming members 64 secured thereto. The end wall 54 has a pair of threaded bores 66 formed therein which are aligned with the seat forming members 64 and a pair of adjusting screws 68 are threadedly secured through the bores 66 and provided with coil spring seat members 70 on their ends disposed within the housing, a pair of compression springs 72 being disposed between corresponding ones of the seat-forming members 64 and 70. Accordingly, it may be seen that each of the bearing member carriers 42 is yieldably urged outwardly of the corresponding housing in which it is snugly and slidably received by means of the coil springs 72, the effective thrust of the latter being adjustable by means of the adjusting screw 68.

The base portions 40 are secured to the upper surface of the roller frame 16 on opposite sides of the bar member 32 with the rollers 44 in horizontal alignment with the bar member 32.

Without the guide means 14, it is possible for the bifurcated member 20 to be angularly shifted relative to the desired axis of rotation of the idler wheel 30 which causes the idler wheel 30 to be misaligned with the corresponding sprocket wheel (not shown). However, the compression springs 72 are very stiff and are adjusted so as to urge the rollers 44 into tight rolling engagement with the bar member 32 thereby preventing angular displacement of the latter while still enabling the bar member 32 to be shifted axially so as to maintain the proper tension on the associated endless track assemblies 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tractor tread assembly of the type including an elongated track roller frame including transversely extending journal means on one end of said frame journaling an idler wheel and mounted on said frame for movement longitudinally thereof, elongated thrust bar means connected at one end to said journal means and at the other end to force means mounted on said frame and disposed between journal means and the other end of said frame applying a yieldable force on said bar means to urge the latter toward said one end of said roller frame, an idler guide comprising a pair of guide assemblies mounted on said roller frame on opposite sides of said bar means and including opposing bearing surfaces guidingly engaging said bar means from opposite sides thereof and resisting lateral deflection of said bar means, said guide assemblies each including a base portion stationarily mounted on said roller frame and a bearing member carrier slidably mounted on each base portion for movement transversely of said roller frame, said opposing bearing surfaces each being defined by a bearing member carried by the corresponding bearing member carrier, and means operatively connected between said base portions and said bearing member carriers independently yieldingly urging said carriers transversely of said roller frame relative to said base portions toward each other.

2. The combination of claim 1 wherein said opposing bearing members each comprises a roller journaled from the corresponding carrier for rotation about an upstanding axis.

3. The combination of claim 2 wherein said means yieldingly urging said carriers include means for adjusting the effective thrust applied to said carriers.

References Cited by the Examiner

UNITED STATES PATENTS

| 465,671 | 12/91 | Le Mieux | 308—6 |
|---|---|---|---|
| 2,522,695 | 9/50 | Walter | 308—6 |
| 2,818,311 | 12/57 | Ashley | 305—10 |

ARTHUR L. LA POINT, *Primary Examiner.*